(12) United States Patent
Ghameshlu et al.

(10) Patent No.: US 6,892,345 B1
(45) Date of Patent: May 10, 2005

(54) INTEGRATED CIRCUIT INCLUDING DUPLICATED SYNCHRONOUS AND ASYNCHRONOUS COMPONENTS

(75) Inventors: Majid Ghameshlu, Vienna (AT); Karlheinz Krause, Planegg (DE)

(73) Assignee: Siemens Aktiengesellschaft, Munich (DE)

( * ) Notice: Subject to any disclaimer, the term of this patent is extended or adjusted under 35 U.S.C. 154(b) by 553 days.

(21) Appl. No.: 10/110,835

(22) PCT Filed: Oct. 17, 2000

(86) PCT No.: PCT/DE00/03648

§ 371 (c)(1),
(2), (4) Date: Apr. 17, 2002

(87) PCT Pub. No.: WO01/29667

PCT Pub. Date: Apr. 26, 2001

(30) Foreign Application Priority Data

Oct. 18, 1999 (DE) .......................... 199 50 131

(51) Int. Cl.[7] ............................ G06F 11/00; H03L 7/00
(52) U.S. Cl. ...................................... 714/798; 327/141
(58) Field of Search ................................ 714/798, 700, 714/731, 736, 819; 327/141; 331/14

(56) References Cited

U.S. PATENT DOCUMENTS 4,703,452 A   10/1987   Abrant et al.
5,317,726 A * 5/1994   Horst .......................... 714/12

FOREIGN PATENT DOCUMENTS

GB   2 268 817 A   1/1994
WO   WO 94/08292   4/1994

OTHER PUBLICATIONS

Fault Detection and Recovery Coverage Improvement by Clock Synchronized Duplicated Systems with Optimal Time Diversit by Kanekawa et al. International Symposium on Fault–Tolerant Computing, Jun. 23–25, 1998 :pp.: 196–200 Inspec Accessio No.: 598569.*

"Design of Synchronous Parallel Controllers for Low–Power Applications" by Wrzyszcz, et al. IEEE International Symposium on Circuits and Systems, 'Connecting the World'., Publication Date: May 12–15, 1996 pp. 755–758 vol. 4 Inspec Accession No.: 5456360.*

* cited by examiner

Primary Examiner—Albert Decady
Assistant Examiner—Cynthia Britt
(74) Attorney, Agent, or Firm—Morrison & Foerster LLP

(57) ABSTRACT

An IC including duplicated primary components which can be operated microsynchronously has at least one synchronization device for synchronizing asynchronous signals to the primary clock. An asynchronous signal intended for the primary components is routed via the synchronization device, synchronized and supplied to the inputs of the primary components. With duplicated asynchronous components, an output signal from just one asynchronous component is synchronized and is supplied to the primary components.

9 Claims, 1 Drawing Sheet

INTEGRATED CIRCUIT INCLUDING DUPLICATED SYNCHRONOUS AND ASYNCHRONOUS COMPONENTS

CLAIM FOR PRIORITY

This application claims priority to International Application No. PCT/DE00/03648 which was published in the German language on Apr. 26, 2001.

TECHNICAL FIELD OF INVENTION

The invention relates to an integrated circuit having at least two similar primary components, and in particular, which can be operated in a microsynchronous operating mode based on a clock from a primary clock system.

BACKGROUND OF THE INVENTION

In many applications of integrated circuits, particularly in call-processing systems, increased fault protection is demanded for security reasons. This is done by self-monitoring and fault detection within the integrated circuit. In many cases, an integrated circuit includes both clocked primary components, which are actuated by a common external or internally produced clock, and components which are independent of this clock. The latter components are referred to as asynchronous components. One example among many is a PCI module ('Personal Computer Interface'), which includes as asynchronous component the PCI circuit for controlling a PCI bus.

A known practice for self-monitoring in integrated circuits is based on tests implemented by means of software. These software tests are invoked regularly, e.g. by means of a test loop. Of course, this solution requires the user to implement a suitable test program which reliably checks all the functions needing to be checked. Such a software test also requires a not inconsiderable proportion of the time which can otherwise be used for the application tasks. In addition, a fault state is detected only at the time of a test pass. The known BIST solution (for 'Built-In Self-Test') implements a self-test on an integrated circuit using hardware. The BIST self-test has an execution time of, normally, 2–10 ms or even more, however, and a fault is not detected until the time of the test pass in this case either.

Another approach to a solution for achieving fault protection involves duplicating the fundamental hardware parts within the integrated circuit. The circuit thus includes at least two similar implementations of its primary components. The way in which such a duplicated circuit operates is, by way of example, that one of the primary components, as the active component, performs the tasks of the circuits, while the other primary component is passive and operates in idle mode; or both primary components operate microsynchronously in parallel in a "tandem mode".

WO 94/08292 describes a duplicated processor control unit comprising two identical, interconnected control units which each have a processor unit, a RAM data store and peripheral circuits. Each processor unit is set up to establish whether it is active or in standby mode. The active processor unit performs the write cycles to the RAM store synchronously in both duplicated RAM stores or in one of the two RAM stores. The standby unit remains in standby until it is invoked on account of a fault in the active unit, in order to replace the unit which has been active up to then. The activities of the two processor units based on WO 94/08292 are thus fundamentally asymmetrical; peripheral components, including the main memory, are, in principle, accessed only by the active processor unit. If there is no comparison with a second processor unit running in parallel, for example, any malfunction in the active processor unit therefore results in the main memory being written incorrectly or in incorrect states in the peripheral area which first need to be subsequently corrected after changeover to the previous standby unit.

In addition, each of the two processor units in WO 94/08292 is equipped with two microprocessors operating in microsynchronized mode. The microsynchronism of the two microprocessors is monitored by means of a comparator block which at all times checks the identity of the two processors' address, data and control signals. Any discrepancy is interpreted as a fault in the processor unit in question. A fault in the microsynchronous operation of the microprocessor pair thus results in an interrupt signal or reset for the entire processor unit. Duplication of the microprocessors within a processor unit results in a "tandem unit" fed by a standard clock signal. However, WO 94/08292 does not reveal how to operate asynchronous components, namely components running independently of the clock for the duplicated microprocessors.

Since, even in a microsynchronous mode, the components involved still operate with a residual clock error, there is the risk when processing asynchronous input signals, particularly if they change in the region of such a clock error, that these input signals will be interpreted differently by the various microsynchronous components. This would thus result in a rapid loss of microsynchronism and would trigger a fault state.

SUMMARY OF THE INVENTION

The invention relates to an integrated circuit having at least two similar primary components which can be operated in a microsynchronous operating mode based on a clock from a primary clock system, and having a comparator device to which the signals from mutually corresponding outputs of the primary components are supplied for comparison with one another and which has a comparator output for outputting a fault signal if there is insufficient accord between these signals.

The invention provides a duplicated—hence comprising at least two primary circuits—integrated circuit in which the primary circuits include asynchronous components without the chance of these components disrupting the microsynchronous operating sequence of the fundamental circuits.

One embodiment of the integrated circuit has at least one synchronization device, actuated by the clock from the primary clock system, for synchronizing asynchronous signals to this clock, which synchronization device has asynchronous input signals supplied to it via at least one input and which synchronization device has at least one signal output for synchronized signals obtained from the asynchronous input signals, the signal output being connected to inputs of the primary components, with similar inputs of the primary components respectively being fed by the same signal output.

The invention can be implemented in a simple manner and permits, the handling of asynchronous input signals such that the input signals can be supplied reliably without adversely affecting the synchronous operating sequence of the primary components.

One preferred embodiment of the invention, in which there is also provision for asynchronous components to be duplicated for additionally increasing fault protection, has at least one set of asynchronous components which can be operated independently of the clock from the primary clock system, the asynchronous components in the/in each set being similar to one another and respectively having at least one asynchronous input connected to an internal output of the primary components, and a respective asynchronous component in the/in each set being associated with a primary component, where the/each set of asynchronous components has at least one associated synchronization device, actuated by the clock from the primary clock system, for synchronizing asynchronous signals to this clock, which synchronization device has at least one signal input which is connected to an asynchronous output of one of the asynchronous components in this set, and at least one signal output for synchronized signals obtained from the signals from this at least one signal input, the signal output being connected to internal inputs of the primary components, with similar inputs of the primary components respectively being fed by the same signal output.

Asynchronous components can thus be duplicated and at the same time ensured that signals they deliver cannot corrupt the microsynchronism. The inventive concept of using one of the output signals from the asynchronous components and of supplying it to the primary components guarantees that the input signals are identical for the primary components, even in the event of greatly differing duty ratios for the asynchronous components.

One advantageous embodiment of the invention allows an additional check on the accord between the asynchronous components by virtue of the comparator device having mutually corresponding asynchronous outputs of the asynchronous components in a set supplied to it for comparison with one another.

It is possible for the set of asynchronous components, or at least one of the sets, to be able to be operated on the basis of a clock from a secondary clock system which is different than the primary clock system. In this case, it is also advantageous if the synchronization device is additionally actuated by the clock from the secondary clock system in question in order to lock signals to this clock, and has at least one signal input which is connected to an internal output of one of the primary components, and has at least one signal output for locked-on signals obtained from the signals from this at least one signal input, the signal output being connected to asynchronous inputs of the asynchronous components in the set in question, with similar inputs of the components in the set respectively being fed by the same signal output.

This embodiment of the inventive concept ensures that the inputs of the asynchronous components have identical signals applied to them, and thus avoids any "disaccord" among the asynchronous components in order to protect the microsynchronism of the primary components better.

So that these internal outputs can also be checked for accord with one another, the comparator device can expediently have the signals from mutually corresponding outputs among these internal outputs supplied to it for comparison with one another.

BRIEF DESCRIPTION OF THE DRAWINGS

The invention is explained in more detail below using an exemplary embodiment which relates to a duplicated ASIC module ('Application Specific Integrated Circuit'). To this end, reference is made to the appended figures, in which.

DETAILED DESCRIPTION OF THE PREFERRED EMBODIMENT

Figure 1:
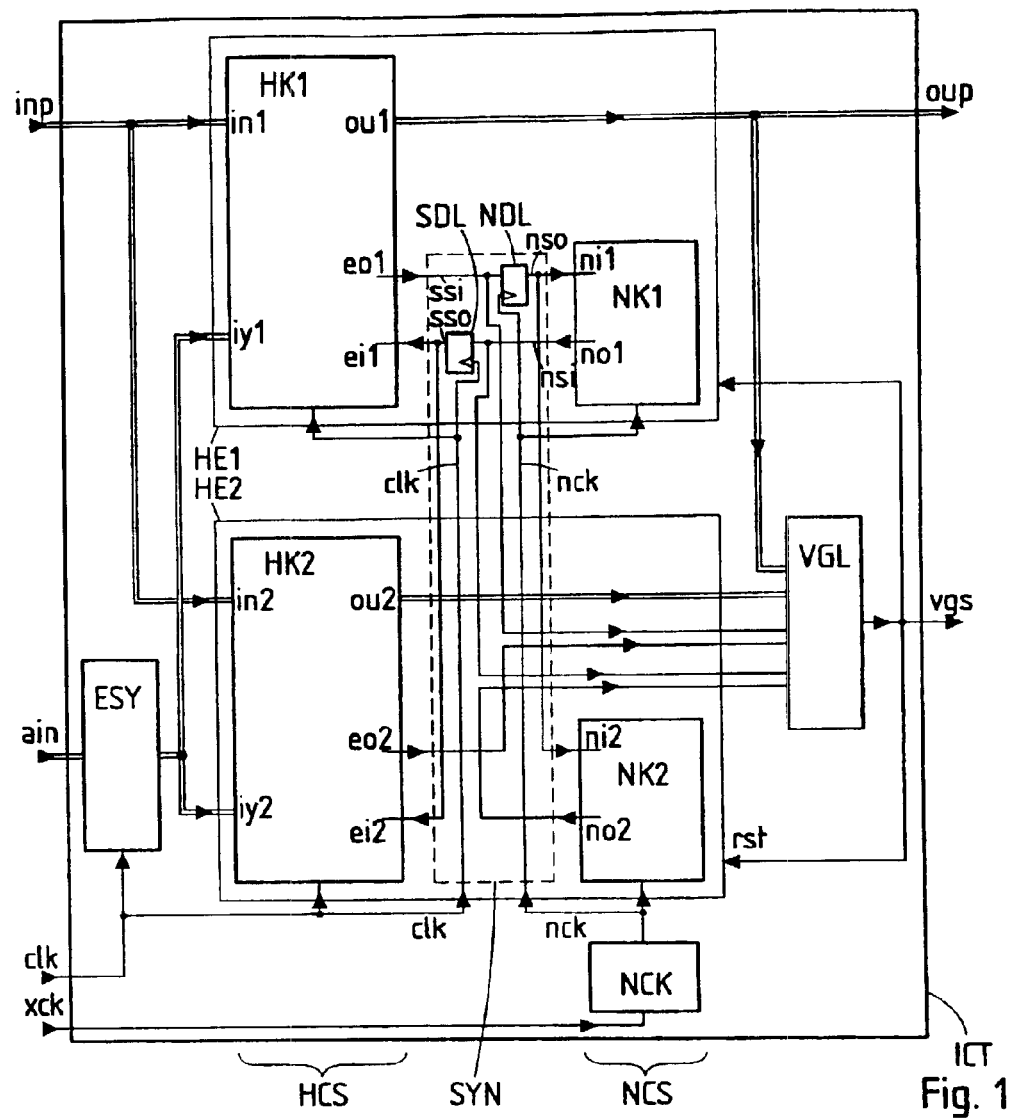
FIG. 1 shows a block diagram of an integrated circuit according to the invention.

In the ASIC module ICT shown in FIG. 1, the core circuit is implemented twice in the form of individual circuits HE1, HE2 which respectively include a primary component HK1, HK2 and at least one component NK1,NK2 which is asynchronous with respect to the primary components. By way of example, the ASIC module is a PCI module for a data processing installation, the primary components of the PCI module operating at the processor clock speed, for example 100 MHz, while the PCI circuit for controlling a PCI bus is operated as an asynchronous component at a different clock speed, e.g. 66 MHz. In addition, the module ICT has components which cannot be associated with one of the individual circuits HE1,HE2, such as the comparator VGL and the synchronization unit ESY.

Figure 2A:
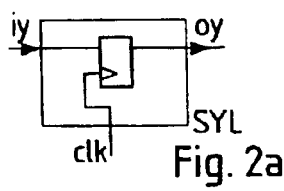
FIG. 2 shows two preferred implementations of a synchronization element.
Figure 2B:
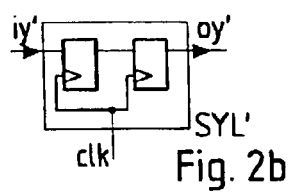

The primary components HK1,HK2 are fed by a common clock signal clk ("primary clock"), which is supplied externally, for example, and run in a microsynchronous mode on the basis of this clock signal clk. The ASIC input lines inp of the module ICT are supplied in the module to the inputs in1,in2 of the two primary components HK1,HK2 in a known manner. The signals on the input lines inp are likewise subject to the primary clock clk. In addition, "asynchronous inputs" ain can be provided. These inputs ain can be used to supply signals which have no clock dependency or are subject to an extraneous clock. So that these asynchronous signals—e.g. in interaction with residual clock errors between the primary components—are reliably used in the same clock cycles of the primary clock, the asynchronous inputs ain are applied to the corresponding inputs iy1,iy2 of the primary components via a synchronization unit ESY. This prevents any "disaccord" between the two primary components HK1,HK2 in microsynchronous mode. In the synchronization unit, each of the inputs ain is routed to the input iy of a respective synchronization element SYL (FIG. 2) which is actuated by the clock clk and whose output oy is supplied to the two corresponding inputs of the primary component (to one of the inputs iy1,iy2, respectively). As FIG. 2a shows, the synchronization elements can be produced using a D-register, for example. Beneficially, the synchronization elements are produced using a plurality of, e.g. two, series-connected D-registers, as shown in FIG. 2b. This allows the signal in question to be fed into a plurality of clocks from the faster clock system, or allows delay time compensation to be implemented.

Figure 3:
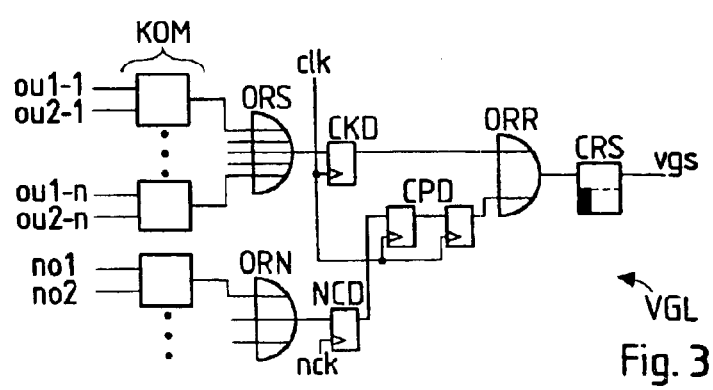
FIG. 3 shows a synchronization circuit for use in the comparator device in the integrated circuit shown in FIG. 1.

The outputs ou1 of one of the first primary component HK1 are routed out of the ASIC module ICT as ASIC outputs oup. The outputs ou2 of the second primary component HK2 are used for checking correct operation of the duplicated circuit. Hence, one individual circuit HE1 operates as a master, while the other individual circuit HE2 is used for the check. To the latter end, the outputs ou1,ou2 of the primary components HK1,HK2 are supplied to a comparator VGL. With reference to FIG. 3, the two groups of outputs ou1-1, . . . , ou1-$n$, ou2-1, . . . , ou2-$n$ are compared with one another in the comparator VGL in comparator cells KOM in each clock cycle. The comparator cells are produced by EXOR gates, for example. An evaluation logic unit ORS combines the comparator outputs using an OR function, stores the result—memory cell CRS—and triggers a fault alarm in a known manner via an output vgs, for example using an interrupt or a reset via a corresponding interrupt/reset input rst. In the components HK1,HK2, the fault state can also be read out, for example, via the input rst and processed using software, e.g. in a self-diagnosis routine.

According to one embodiment of the invention, asynchronous function blocks within the ASIC circuit are likewise duplicated. The interface for locking on is implemented once on the basis of the invention, however, as explained in more detail below.

As FIG. 1 shows, each individual circuit HE1,HE2 has a respective asynchronous component NK1,NK2. The asynchronous components are equivalent to one another, in line with the principle of duplicating the ASIC components. In the example shown, they are actuated by a separate clock nck ("secondary clock") which is formed from an externally supplied clock xck, for example using a clock generator NCK. In the example shown, this external clock xck is different than the primary clock clk. They can be the same, of course. By way of example, the primary clock can be a 100 MHz clock, and the secondary clock can be a 33 MHz clock. The asynchronous components NK1,NK2 fed by the secondary clock nck represent a separate clock system with respect to the clock on which they are based, which separate clock system will be referred to as "secondary clock system" NCS in the present case, in contrast to the "primary clock system" HCS for the primary components HK1,HK2, based on the primary clock clk. It should be noted in this context that the use of the terms "primary" and "secondary" does not relate to any hierarchy for the clocks, for example, but is chosen merely with reference to the microsynchronism (which is primarily implemented in the primary components).

The primary components HK1,HK2 and their respective associated asynchronous components NK1,NK2 are connected to one another by a synchronization device SYN. The synchronization device is used firstly for locking on the signals from internal outputs of the primary components, which need to be supplied as input signals to the asynchronous components, and secondly for synchronizing asynchronous output signals from the asynchronous components, which are conversely supplied to internal inputs of the primary components.

In particular, the internal output eo1 of the first primary component HK1 is supplied the input ni1 of the asynchronous component NK1. The alignment with the asynchronous clock nck which this requires is performed by a synchronization element NDL whose input ssi is connected to the internal output eo1. The synchronization element NDL is, by way of example, a D-register actuated with the clock nck, or (cf. FIG. 2b) is produced using two D-registers in series.

The output nso of the synchronization element NDL is connected not only to the input ni1 of the first asynchronous component NK1, but also to the corresponding input ni2 of the other asynchronous component NK2. On the basis of the invention, the internal output eo1 thus feeds the associated inputs ni1,ni2 in the overall set of asynchronous components NK1,NK2.

The output eo2 of the second primary component HK2 which corresponds to this output eo1 is used for the purposes of comparison. For this, the signals from the two outputs eo1,eo2 are supplied to the comparator device VGL, as shown in FIG. 1. These signals are compared in basically the same manner as the outputs ou1,ou2 are compared, and this comparison is therefore not explicitly illustrated in FIG. 3.

Other internal output signals (not shown in FIG. 1) from the primary components are converted for the asynchronous components in the same way as for the outputs eo1,eo2 and the associated inputs ni1,ni2 of the asynchronous components.

The asynchronous output signals returned to the primary components HK1,HK2 by the asynchronous components NK1,NK2 are synchronized in a similar way. This is shown in FIG. 1 using the example of the asynchronous outputs no1,no2. Synchronization to the clock clk from the primary clock system is performed by a synchronization element SDL whose input nsi is connected to the output no1 of one of the asynchronous components NK1. In this case, the synchronization element SDL is, by way of example, one or two (cf. FIG. 2b) D-registers actuated with the clock clk. Its output sso is connected both to the internal input ei1 of the first primary component HK1 and to the corresponding input ei2 of the other primary component HK2. On the basis of the invention, the asynchronous output no1 feeds the associated inputs ei1,ei2 of the primary components HK1,HK2.

As in the case of the internal outputs eo1,eo2, the signals from the two asynchronous outputs no1,no2 are supplied to the comparator device VGL. This allows, as one advantage of the invention, the synchronism of the duplicated asynchronous components in the system to be monitored. The comparison of the asynchronous signals from the outputs no1,no2 and the processing of the result of the comparison are shown in the example in FIG. 3. The output signals no1,no2 are continually compared by a comparator cell KOM, and an OR function—gate ORN—is used to combine the comparisons of the secondary clock system in question. The comparison signals obtained in this way for the individual clock systems—outputs of the gates ORS and ORN—are then synchronized to one another. To this end, they are beneficially routed via a respective D-register which is actuated with the respective separate clock clk or nck. The comparison signal for the "slower" clock system, in this case that for the 33 MHz clock nck, is then converted to the faster clock, in this case the 100 MHz clock clk, using a synchronization circuit CPD. Finally, the comparison signals, which are now based on a standard clock, are combined, e.g. using an OR gate ORR which has a memory CRS connected downstream. The invention makes it possible to detect a fault state quickly and directly within a few system clock cycles, for example in the example shown in FIG. 3 after no more than two clock cycles of the secondary clock nck plus the delay time in the OR gates and in the memory flip-flop CRS.

Other asynchronous output signals (not shown in FIG. 1) are converted for the primary components in the same way as for the outputs no1,no2 and the associated internal inputs ei1,ei2.

It should be pointed out at this juncture that FIG. 1 shows an exemplary set NK1,NK2 of asynchronous components. It is likewise possible for a plurality of asynchronous components to be implemented in an individual circuit, with what has been said above applying in a similar manner for a respective asynchronous component. In this context, the various sets of asynchronous components can also respectively be fed by various secondary clocks.

The invention permits self-monitoring both in the microsynchronous components and in the asynchronous components of an integrated circuit, in particular of an ASIC module, with software and hardware faults not being discovered for the first time in a test pass, e.g. in a self-test routine, but rather immediately during operation. The appropriate software can therefore react to a fault very quickly. The inclusion of the asynchronous components in the duplication and the monitoring by the comparator device means that fast self-monitoring is also possible for these components, which is particularly advantageous in comparison to the time-consuming monitoring by a BIST routine.

What is claimed is:

1. An integrated circuit, comprising:
    at least two primary components operated in a synchronous operating mode based on a clock from a primary clock system;
    a comparator device to which the signals from mutually corresponding outputs of the primary components are supplied for comparison with one another;
    a comparator output for outputting a fault signal if there is insufficient accord between these signals; and
    at least one synchronization device, actuated by the clock from the primary clock system, for synchronizing asynchronous signals to the clock, which synchronization device has asynchronous input signals supplied thereto via at least one input and which synchronization device has at least one signal output for synchronized signals obtained from the asynchronous input signals, said signal output being connected to inputs of the primary components, and having inputs of the primary components respectively being fed by the same signal output.

2. The integrated circuit as claimed in claim 1, further comprising at least one set of asynchronous components operated independently of the clock from the primary clock system, the asynchronous components having at least one asynchronous input connected to an internal output of the primary components, and a respective asynchronous component in each set being associated with a primary component, where each set of asynchronous components has at least one associated synchronization device, actuated by the clock from the primary clock system, for synchronizing asynchronous signals to the clock, which synchronization device has at least one signal input which is connected to an asynchronous output of one of the asynchronous components, and at least one signal output for synchronized signals obtained from the signals from the at least one signal input, said signal output being connected to internal inputs of the primary components, with inputs of the primary components respectively being fed by the same signal output.

3. The integrated circuit as claimed in claim 2, wherein the comparator device has mutually corresponding asynchronous outputs of the asynchronous components in a set supplied to it for comparison with one another.

4. The integrated circuit as claimed in claim 2, wherein at least one of the sets of asynchronous components can be operated on the basis of a clock from a secondary clock system which is different than the primary clock system.

5. The integrated circuit as claimed in claim 1, wherein the comparator device has mutually corresponding asynchronous outputs of the asynchronous components in a set supplied to it for comparison with one another.

6. The integrated circuit as claimed in claim 5, wherein at least one of the sets of asynchronous components can be operated on the basis of a clock from a secondary clock system which is different than the primary clock system.

7. The integrated circuit as claimed in claim 1, wherein at least one of the sets of asynchronous components can be operated on the basis of a clock from a secondary clock system which is different than the primary clock system.

8. The integrated circuit as claimed in claim 7, wherein the synchronization device is actuated by the clock from the secondary clock system to lock signals to the clock, and has at least one signal input which is connected to an internal output of one of the primary components, and has at least one signal output for locked-on signals obtained from the signals from the at least one signal input, said signal output being connected to asynchronous inputs of the asynchronous components in the set, with inputs of all the components in the set being fed by the same signal output.

9. The integrated circuit as claimed in claim 8, wherein the comparator device has the signals from the internal outputs which correspond to one another supplied thereto for comparison with one another.

* * * * *